United States Patent
Yanagita et al.

(10) Patent No.: US 11,523,525 B2
(45) Date of Patent: Dec. 6, 2022

(54) ELECTRONIC MODULE

(71) Applicants: Sumitomo Wiring Systems, Ltd., Mie (JP); TOYOTA JIDOSHA KABUSHIKI KAISHA, Toyota (JP)

(72) Inventors: Yoshiki Yanagita, Mie (JP); Takayuki Takeuchi, Mie (JP); Yuki Ohira, Nisshin (JP)

(73) Assignees: Sumitomo Wiring Systems, Ltd., Yokkaichi (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 159 days.

(21) Appl. No.: 16/788,670

(22) Filed: Feb. 12, 2020

(65) Prior Publication Data

US 2020/0275567 A1  Aug. 27, 2020

(30) Foreign Application Priority Data

Feb. 21, 2019  (JP) ............................. JP2019-029390

(51) Int. Cl.
H05K 5/02 (2006.01)
B60R 16/023 (2006.01)
H01H 45/12 (2006.01)
H01H 45/04 (2006.01)

(52) U.S. Cl.
CPC ....... H05K 5/0213 (2013.01); B60R 16/0239 (2013.01); H01H 45/04 (2013.01); H01H 45/12 (2013.01)

(58) Field of Classification Search
CPC ........................... H05K 5/0213; B60R 16/0239
See application file for complete search history.

(56) References Cited

U.S. PATENT DOCUMENTS

| | | | | |
|---|---|---|---|---|
| 2010/0326692 A1* | 12/2010 | Ozawa | ................ | B60R 16/0239 174/50.52 |
| 2011/0016836 A1* | 1/2011 | Yano | ...................... | F21V 31/03 55/491 |
| 2011/0139482 A1* | 6/2011 | Soh | .................... | B60R 16/0238 174/50 |
| 2011/0170260 A1* | 7/2011 | Sarginger | ............ | B60R 16/0239 174/547 |
| 2018/0065576 A1* | 3/2018 | Kawaguchi | ............ | H01R 9/226 |

FOREIGN PATENT DOCUMENTS

| | | | |
|---|---|---|---|
| CN | 107800088 A | 3/2018 | |
| JP | 2001238331 A | 8/2001 | |
| JP | 2002-373512 | * 12/2002 | ............... H05K 5/02 |
| JP | 2007047188 A | 2/2007 | |

(Continued)

OTHER PUBLICATIONS

Machine translation of JP2002-373512, on Nov. 10, 2021, 12 pages (Year: 2021).*

(Continued)

*Primary Examiner* — Hung V Ngo
(74) *Attorney, Agent, or Firm* — Honigman LLP (57) ABSTRACT

In an electronic module for a vehicle including a case in which an electronic component such as a relay is mounted, the electronic module includes a discharge hole which discharges liquid contained in the case, and the discharge hole includes a peripheral edge of a predetermined dimension determined based on surface tension of the liquid.

2 Claims, 6 Drawing Sheets

(56) References Cited

FOREIGN PATENT DOCUMENTS

| | | |
|---|---|---|
| JP | 2014027754 A | 2/2014 |
| JP | 2014-079093 A | 5/2014 |
| JP | 2014236571 A | 12/2014 |
| JP | 2018042356 A | 3/2018 |
| JP | 2018109346 A | 7/2018 |
| WO | 2014054461 A1 | 4/2014 |

OTHER PUBLICATIONS

Machine translation for JP2014-236571, 4 pages, translated on May 6, 2022 (Year: 2022).*

Japanese Office Action, Application No. JP 2019-029390, dated Apr. 13, 2021.

\* cited by examiner

ELECTRONIC MODULE

CROSS-REFERENCE TO RELATED APPLICATION

This Non-provisional application claims priority under 35 U.S.C § 119(a) of Patent application No. 2019-029390 filed in Japan on Feb. 21, 2019, the entire contents of which are hereby incorporated by reference.

FIELD

This disclosure relates to an electronic module for a vehicle comprising a case in which an electronic component is mounted.

BACKGROUND

Conventionally, an electronic module accommodating an electronic component such as a relay is mounted in a vehicle.

Japanese Patent Laid-Open Publication No. 2014-79093 discloses a power-supply apparatus which comprises a relay provided with an openable contact and with an exciting coil for switching the opening-closing of the contact, in which the contact of the relay is electrically connected to a bus bar and the bus bar is provided with a heat-dissipation mechanism so that the bus bar can function as a current path and a heat-dissipation path and the heat-dissipation of the relay can be improved.

SUMMARY

In contrast, a vehicle in which the electronic module is mounted may be involved in a flood or an accident, and water or sea water may flow in the electronic module of the vehicle.

In such a case, it is necessary to rapidly discharge the water or sea water contained in the electronic module without leaving the water or sea water behind.

However, in the power-supply apparatus disclosed in Japanese Patent Laid-Open Publication No. 2014-79093, the discharge of unnecessary liquid which flows into the power-supply apparatus is not devised, and the problems as described above cannot be solved.

The present disclosure has been made with the aim of solving the above problems, and an object thereof is to provide an electronic module for a vehicle comprising a case in which an electronic component is mounted, which is capable of rapidly discharging unnecessary liquid flowing into the case, without leaving the liquid behind.

An electronic module according to Embodiment of this disclosure is an electronic module for a vehicle comprising a case in which an electronic component is mounted, comprising a discharge hole which discharges liquid contained in the case, wherein the discharge hole includes a peripheral edge of a predetermined dimension determined based on surface tension of the liquid.

According to this disclosure, an electronic module for a vehicle comprising a case in which an electronic component is mounted, is capable of rapidly discharging unnecessary liquid which flows into the case, without leaving the liquid behind.

The above and further objects and features will more fully be apparent from the following detailed description with accompanying drawings.

DETAILED DESCRIPTION

First of all, Embodiment of this disclosure is recited and explained. Moreover, at least parts of Embodiment described below may be combined arbitrarily.

An electronic module according to Embodiment of this disclosure is an electronic module for a vehicle comprising a case in which an electronic component is mounted, comprising a discharge hole which discharges liquid contained in the case, wherein the discharge hole includes a peripheral edge of a predetermined dimension determined based on surface tension of the liquid.

In this Embodiment, the discharge hole for discharging liquid contained in the case includes the peripheral edge of the predetermined dimension determined based on surface tension of the liquid, and the liquid does not therefore form a film over the discharge hole, which can discharge the liquid contained in the case outward from the case without leaving the liquid behind.

In the electronic module according to Embodiment of this disclosure, the predetermined dimension is larger than at least a dimension of the peripheral edge of the discharge hole in a case where an own-weight force acting on a droplet of the liquid from the discharge hole toward an outside of the case due to an own weight of the droplet is balanced with a pull force pulling the droplet to the peripheral edge of the discharge hole due to surface tension.

In this Embodiment, the predetermined dimension is larger than a dimension of the peripheral edge of the discharge hole in a case where an own-weight force acting on a droplet of the liquid from the discharge hole toward an outside of the case due to an own weight of the droplet is balanced with a pull force pulling the droplet to the peripheral edge of the discharge hole due to surface tension. Accordingly, the own-weight force is larger than the pull force, and liquid does not form a film over the discharge hole.

The electronic module according to Embodiment of this disclosure comprises a leg part which maintains a gap between the case and a fixed object to which the case is fixed, wherein the leg part has a dimension determined based on a contact angle between the liquid and the case and on a contact angle between the liquid and the fixed object in a direction in which the case faces the fixed object.

In this Embodiment, the case of the electronic module is disposed by the leg part away from the fixed object only by a dimension determined based on the contact angle of the liquid and the case and on the contact angle of the liquid and the fixed object. Accordingly, failure in the discharge of liquid through the discharge hole caused because a droplet to be formed over the discharge hole contacts a droplet formed on the fixed object and combines with the same can be prevented.

The electronic module according to Embodiment of this disclosure comprises a wall part which protrudes from a bottom of the case so as to intersect with an inner surface of the bottom, wherein the inner surface of the bottom is divided into a plurality of areas by the wall part, and at least one discharge hole is provided in each area.

In this Embodiment, at least one discharge hole is provided in each of a plurality of areas divided by the wall part protruding from the inner surface of the bottom of the case. Accordingly, liquid contained in each area is discharged without leaving the liquid behind.

The electronic module according to Embodiment of this disclosure is explained with reference to the drawings below. Note that the present disclosure is not limited to these exemplifications, and is defined by the Claims, which intends to include all the meanings equivalent to the Claims and all the modifications within the Claims.

The following description explains this Embodiment using as an example an electronic module for a vehicle in which a relay is mounted as an electronic component, for example.

Figure 1:
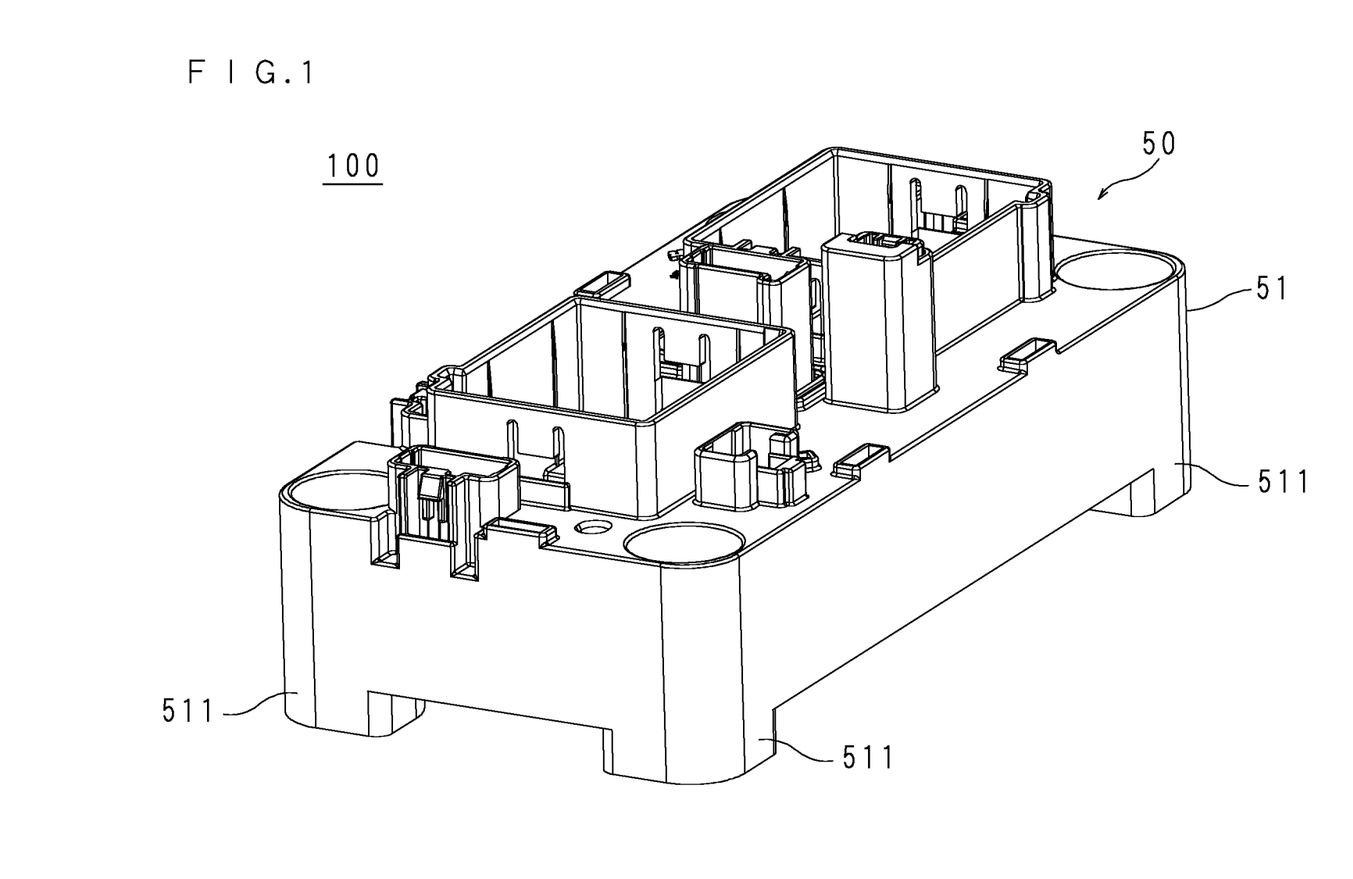
FIG. 1 is a perspective view showing an electronic module according to this Embodiment.
Figure 2:
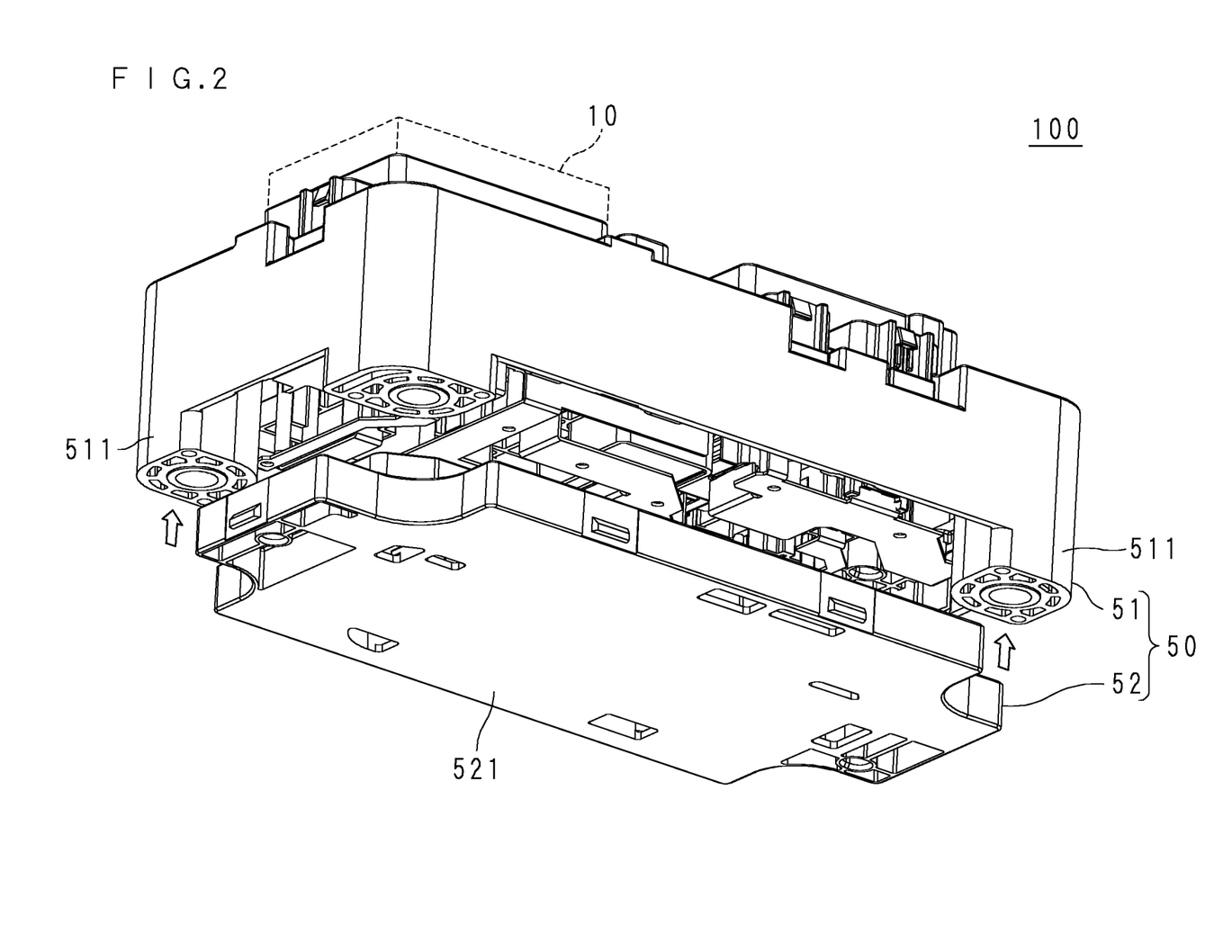
FIG. 2 is a partial exploded view of the electronic module according to this Embodiment.
Figure 3:
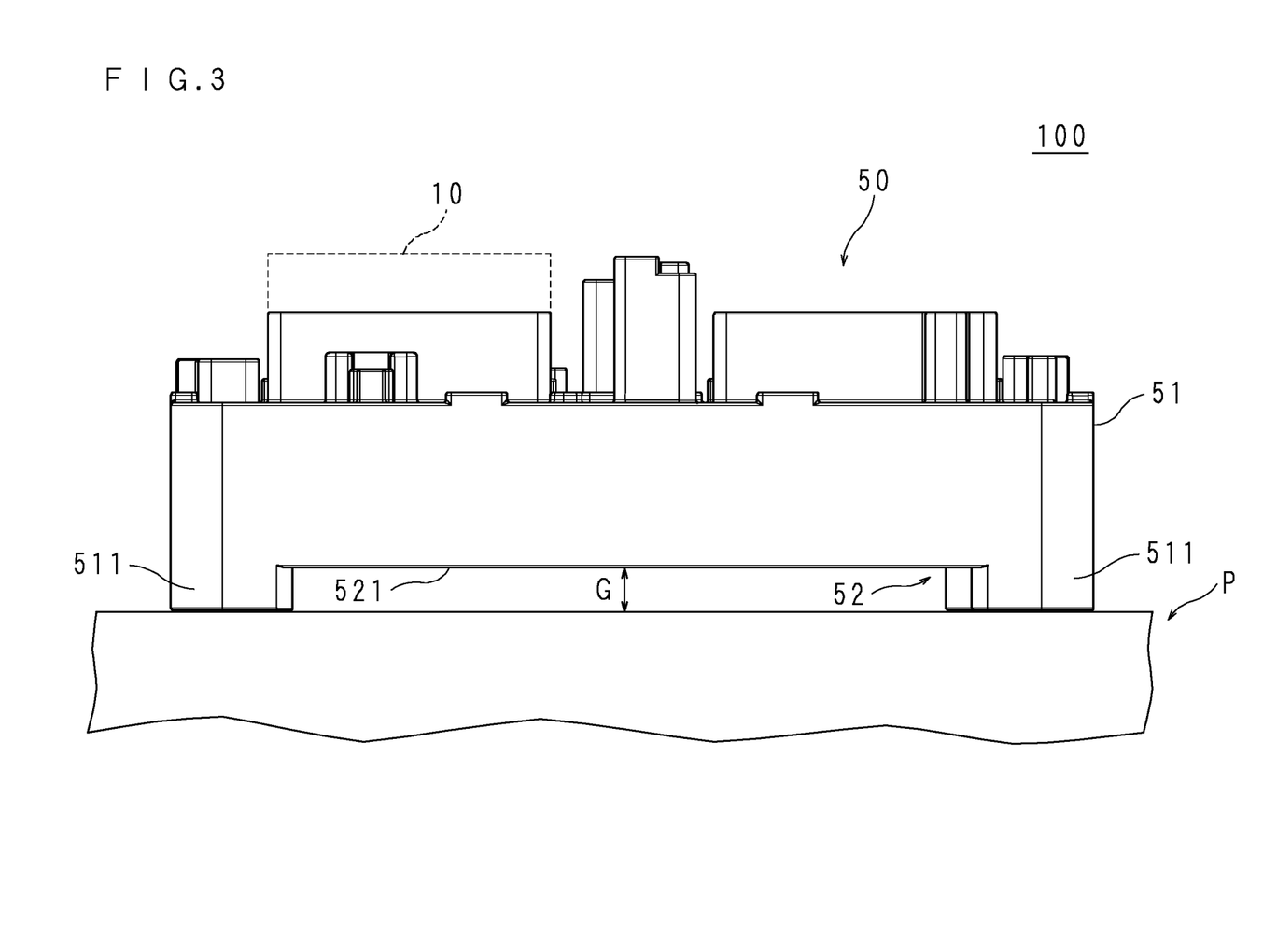
FIG. 3 is a side view showing the electronic module according to this Embodiment.

FIG. 1 is a perspective view showing an electronic module 100 according to this Embodiment, FIG. 2 is a partial exploded view of the electronic module 100 according to this Embodiment, and FIG. 3 is a side view showing the electronic module 100 according to this Embodiment. The electronic module 100 is attached to an exterior of a battery pack P (fixed object) of an EV (Electric Vehicle), for example. The electronic module 100 comprises a case 50 on which a relay 10 (electronic component) is mounted, for example. The relay 10 is switched to an ON state in a mode that a vehicle runs, and is switched to an OFF state in a mode that the vehicle does not run, for example.

The case 50 is made of resin and includes a lower case 52 and an upper case 51 which covers the lower case 52. That is, the electronic module 100 according to this Embodiment is attached such that a bottom plate 521 of the lower case 52 faces the battery pack P. In more detail, leg parts 511 having a shape of a bottomed tube are provided in four corners of the upper case 51 respectively, and a through hole is formed in a bottom of each leg part 511. For example, a screw is inserted into the through hole of the leg part 511 and is screwed into the battery pack P, which can attach the electronic module 100 to the battery pack P.

At this time, in the electronic module 100, the bottom plate 521 of the lower case 52 faces the battery pack P (an outer surface thereof) and a predetermined gap G is maintained between the bottom plate 521 and the battery pack P.

Hereinafter, in a facing direction in which the electronic module 100 faces the battery pack P, a side of the electronic module 100 is an upper side and a side of the battery pack P is a lower side, for convenience of description.

Figure 4:
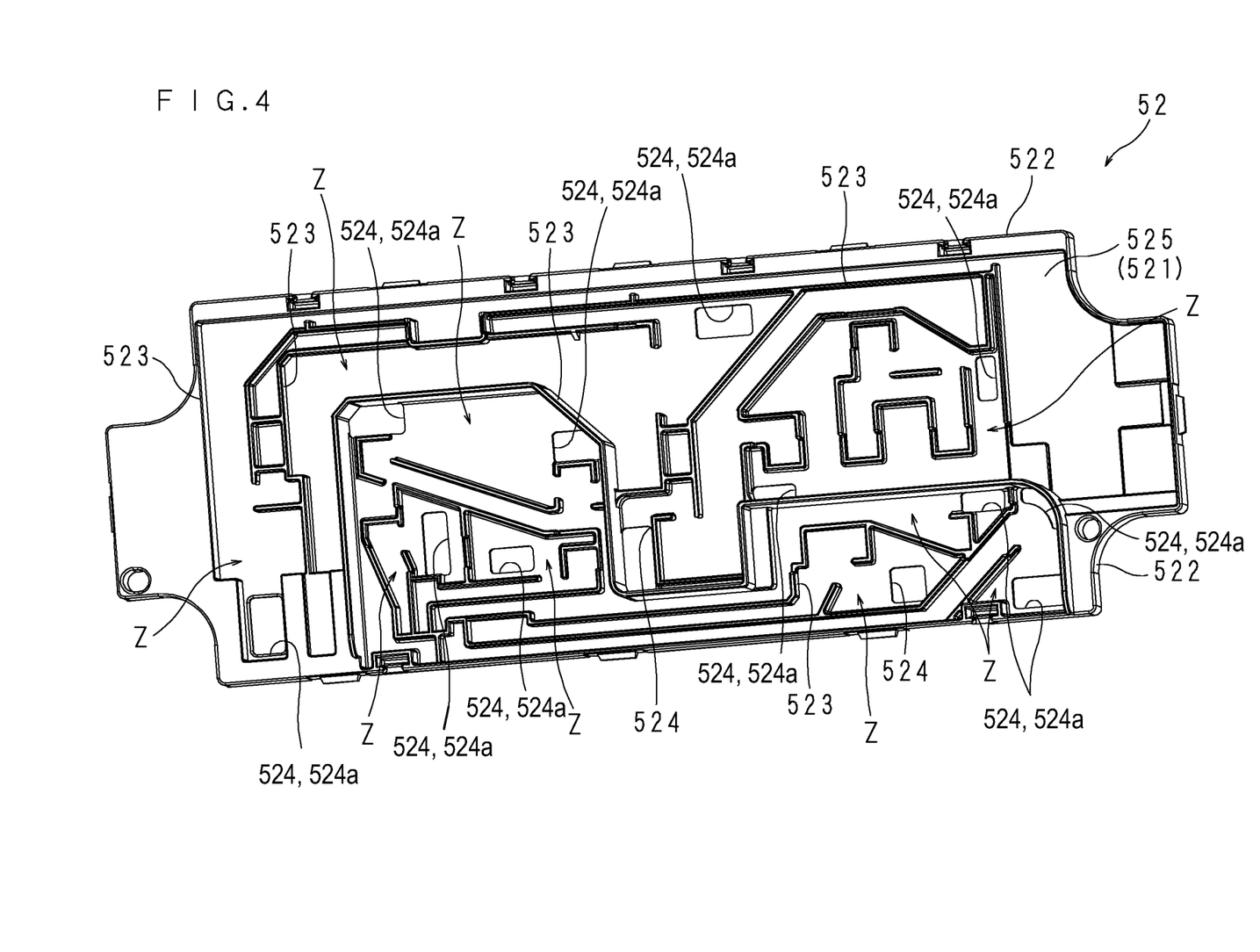
FIG. 4 is a perspective view showing a lower case of the electronic module according to this Embodiment.

FIG. 4 is a perspective view showing the lower case 52 of the electronic module 100 according to this Embodiment.

The bottom plate 521 of the lower case 52 has a shape of a rectangle whose four corners are cut. An outer side wall 522 is provided around a periphery of the bottom plate 521 in a direction which intersects with an inner surface 525 of the bottom plate 521. The outer side wall 522 is fitted into the upper case 51, which couples the lower case 52 to the upper case 51.

In the bottom plate 521, an inner side wall 523 protrudes in the direction which intersects with the inner surface 525 of the bottom plate 521 on the inside with respect to the outer side wall 522, i.e., on the center side of the bottom plate 521 with respect to the outer side wall 522. The outer side wall 522 and the inner side wall 523 have the same dimensions in the direction in which the outer side wall 522 or the inner side wall 523 protrudes.

The inner side wall 523 stands continuously or intermittently on the inner surface 525 of the bottom plate 521. The inner side wall 523 standing continuously has a shape of a closed curve in a view of the facing direction. That is, the inner side wall 523 divides the inner surface 525 of the bottom plate 521 into a plurality of areas. In more detail, a plurality of bus bars are provided in the electronic module 100, and the inner side wall 523 stands so as to surround each bus bar and insulates the bus bars from each other.

Hereinafter, in the inner surface 525, areas defined by the inner side wall 523 in this manner are called defined areas Z.

The EV in which the electronic module equipped with the electronic component is mounted may be involved in a flood and the like and may suffer damage of submergence. In such a case, it is necessary to rapidly discharge water contained in the electronic module, and a plurality of discharge holes are therefore provided in the lower case of the electronic module.

However, the discharge of water is not easy since the electronic module is provided with the insulation mechanism (the inner side wall 523) as described above. Moreover, in a case where an amount of water remaining in the electronic module decreases in the process of discharging water, a water film is formed over the discharge hole due to surface tension of water, and then the water cannot be discharged completely.

In contrast, the electronic module 100 according to this Embodiment is configured so as to rapidly discharge water without leaving the water behind, even if liquid such as water has flowed into the electronic module 100. Hereinafter, such a configuration is explained in detail.

In the electronic module 100 according to this Embodiment, discharge holes 524 are provided at a plurality of positions in the bottom plate 521 of the lower case 52. The discharge holes 524 are through holes which pass through the bottom plate 521 in a thickness direction of the bottom plate 521.

In the electronic module 100 according to this Embodiment, at least one discharge hole 524 is formed in each defined area Z. Moreover, each discharge hole 524 is provided near the inner side wall 523 related to the defined area Z.

Accordingly, water which accumulates in the defined area Z defined by the inner side wall 523 is discharged through the discharge hole 524 disposed in the defined area Z, which can prevent water from remaining in the defined area Z.

Furthermore, in the electronic module 100 according to this Embodiment, each discharge hole 524 is provided near the inner side wall 523, noting that water easily accumulates near the inner side wall 523 due to surface tension, the Coanda effect and the like. This allows water remaining in the defined area Z to be discharged more effectively. It is more desirable that the discharge hole 524 is disposed in a corner of each defined area Z.

Note that although FIG. 4 illustrates a case where the discharge hole 524 has a shape of an approximately rectangle, the shape is not limited to this. The discharge hole 524 may have a shape of a circle or a triangle, for example.

The discharge hole 524 in the electronic module 100 according to this Embodiment has a dimension of a peripheral edge 524a (the peripheral edge defining the dimension of the discharge hole 524) determined based on surface tension of liquid which flows into the electronic module 100. The following description explains a method of determining the dimension of the peripheral edge 524*a* of the discharge hole 524 in the electronic module 100 according to this Embodiment. For convenience of description, the following description explains as an example a case where the lower case 52 is made of resin, an exterior of the battery pack P is made of aluminum, the discharge hole 524 is circular and sea water flows into the electronic module 100.

Figure 5:
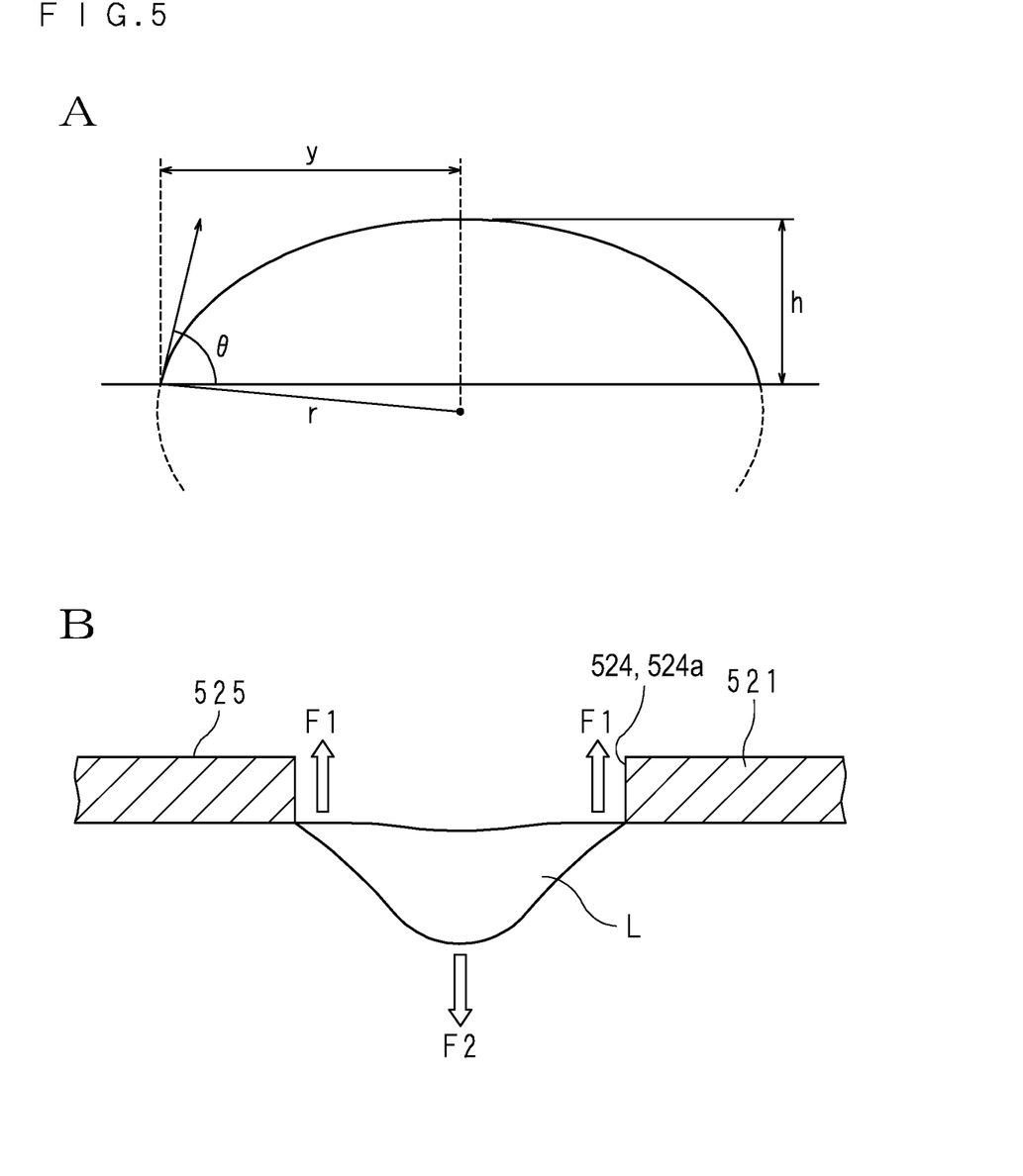
FIG. 5 is an explanatory view explaining a method of determining a dimension of a peripheral edge of a discharge hole in the electronic module according to this Embodiment.

FIG. 5 is an explanatory view explaining a method of determining the dimension of the peripheral edge 524*a* of the discharge hole 524 in the electronic module 100 according to this Embodiment. FIG. 5A shows a state where a droplet drops to the bottom plate 521 to have a rounded shape of a spherical segment, for example, and is a view showing a factor used to determine the dimension of the peripheral edge 524*a* of the discharge hole 524. Moreover, FIG. 5B is a cross-sectional view showing a state where a water film is formed at an outer of the peripheral edge 524*a* of the discharge hole 524.

As shown in FIG. 5B, in a state where a water film is formed at the outer of the peripheral edge 524*a* of the discharge hole 524, an own-weight force F2 acting on a droplet L of the liquid from the discharge hole 524 toward the outside of the case 50 due to an own weight of the droplet L is balanced with a pull force F1 pulling the droplet L to the peripheral edge 524*a* of the discharge hole 524 due to surface tension. In such a state, liquid which remains in the electronic module 100 cannot be discharged through the discharge hole 524 outward from the electronic module 100. Accordingly, it is necessary to adjust the own-weight force F2 larger than the pull force F1 in order to discharge the remaining liquid outward from the electronic module 100 without leaving the liquid behind.

The own-weight force F2 is determined based on the droplet L's own weight (or volume) and the pull force F1 is determined based on a radius of the discharge hole 524. That is, the pull force F1 and the own-weight force F2 are expressed with formulas as shown below.

$$F1 = 2\pi yT \cos\theta \quad \text{<Formula 1>}$$

$$F2 = mg = \rho Vg \quad \text{<Formula 2>}$$

Here, y is a distance from the center to the peripheral edge 524*a* of the discharge hole 524, i.e., a radius of the discharge hole 524, T is surface tension of the droplet L, θ is a contact angle between the droplet L and a surface of the bottom plate 521 as shown in FIG. 5A, ρ is a density of the droplet L, m is weight of the droplet L, V is a volume of the droplet L, and g is acceleration of gravity.

Moreover, "y" and "h" (a height of the droplet L) can be expressed from FIG. 5A, as shown below.

$$y = r\cos(90-\theta) \quad \text{<Formula 3>}$$

$$h = r(1-\sin(90-\theta)) \quad \text{<Formula 4>}$$

Here, r is a distance from the center of a spherical segment of the droplet L to a surface (an edge) of the droplet L (hereinafter referred to as a radius of the droplet L).

The volume V of the droplet L can be expressed by the following formula since the droplet L has a shape of the spherical segment.

$$V = \pi h^2(3r-h)/3 \quad \text{<Formula 5>}$$

Based on the above, the Formula 1 and the Formula 2 can be expressed as a function of y (the radius of the discharge hole 524) by means of the Formulas 3 to 5. That is, the pull force F1 and the own-weight force F2 can be changed by y, and it is possible to adjust the own-weight force F2 larger than the pull force F1 by adjusting y.

Actually, T (the surface tension of the droplet L), ρ (the density of the droplet L), g (the acceleration of gravity) and y (the radius of the discharge hole 524) are known and θ (the contact angle) can be measured, which can obtain values of r (the radius of the droplet L) and h (the height of the droplet L).

Assuming that a droplet L formed at the outer of the peripheral edge 524*a* of the discharge hole 524 (refer to FIG. 5B) has the similar shape to that of a droplet formed on the bottom plate 521 (refer to FIG. 5A), a value of y will be obtained in a case where the lower case 52 is made of resin and the droplet L is sea water as described above.

Here, T is 0.07275 kg·mm/s² (20° C.), ρ is 0.000001035 kg/mm³, g is 9800 mm/s², and θ is 70°. These values are assigned to the Formulas 1 to 5 to obtain h and y, and then h is 4.155 mm and y is 5.934 mm.

That is, in the case where the lower case 52 is made of resin and the droplet L is sea water, when y is 5.934 mm, the pull force F1 is balanced with the own-weight force F2.

For this reason, in the electronic module 100 according to this Embodiment, the dimension of the peripheral edge 524*a* of the discharge hole 524 is determined by means of a value higher than y obtained as described above at least.

For example, the dimension of the peripheral edge 524*a* of the discharge hole 524 in the electronic module 100 according to this Embodiment is determined by a formula of "2×T×y*" by means of y* (y*>y) obtained by adding a design common difference etc. to the value of y obtained as described above.

This allows the own-weight force F2 to be adjusted larger than the pull force F1, which can prevent the droplet L from forming a film over the discharge hole 524. Accordingly, the electronic module 100 according to this Embodiment is capable of discharging an unnecessary droplet which remains in the electronic module 100 (lower case 52) outward from the electronic module 100 as much as possible, without leaving the droplet behind.

Note that although the above description explains as an example a case where in the electronic module 100 the lower case 52 is made of resin, the exterior of the battery pack P is made of aluminum and sea water flows into the electronic module 100, the present disclosure is not limited to this. Needless to say, by appropriately selecting materials of the lower case 52 and the battery pack P and obtaining T (surface tension of a droplet L), ρ (a density of a droplet L), h (a height of a droplet L) and θ (a contact angle) according to a kind of liquid, it is possible to determine a dimension of the peripheral edge 524*a* of the discharge hole 524 which can solve the problems of the present disclosure.

Moreover, a case where a spherical segment of a droplet is already formed also directly below the discharge hole 524 of the lower case 52 is assumed. In such a case, the droplet L combines with the droplet formed directly below and forms a large droplet when the droplet L forms a film over the outer edge of the discharge hole 524 (refer to FIG. 5), and the large droplet thereby closes the discharge hole 524, which hinders the discharge of unnecessary liquid.

In the electronic module 100 according to this Embodiment, the leg part 511 has a specific dimension in the facing direction, which can deal with such a problem. The dimension of the leg part 511 in the facing direction is determined based on a contact angle between the liquid and the case 50 and on a contact angle between the liquid and the battery pack P. Hereinafter, the dimension of the leg part 511 in the facing direction is called a height of the leg part 511.

Figure 6:
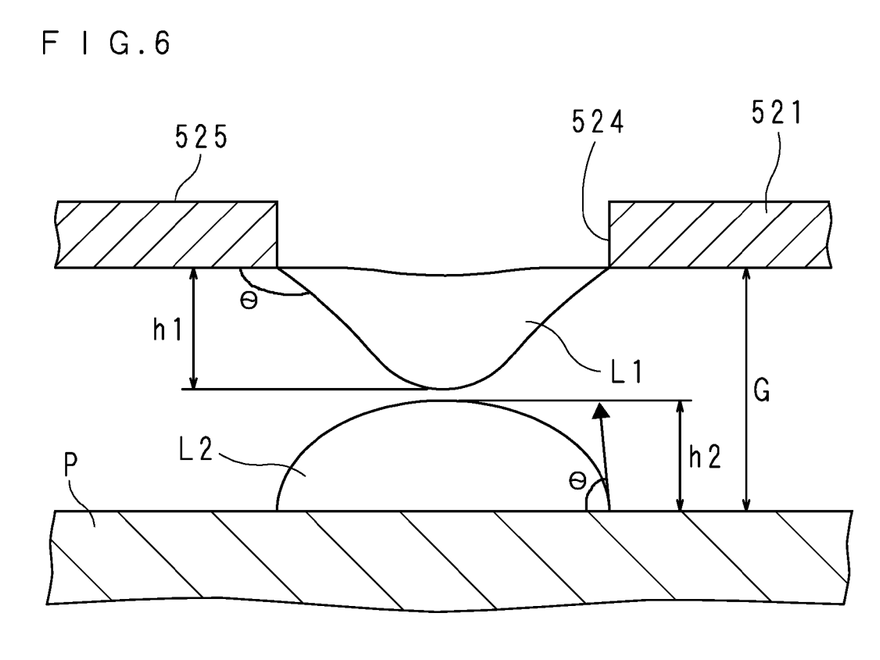
FIG. 6 is an explanatory view explaining a height of a leg part of the electronic module according to this Embodiment.

FIG. 6 is an explanatory view explaining the height of the leg part 511 of the electronic module 100 according to this Embodiment. FIG. 6 shows a case where a droplet L1 forms a film at the outer of the peripheral edge 524a of the discharge hole 524 and a spherical segment of a droplet L2 is formed on the outer surface of the battery pack P also directly below the discharge hole 524. The following description explains a method of determining the height of the leg part 511 by means of FIGS. 5 and 6. Note that it is assumed that the discharge hole 524 is circular, liquid is sea water, and a droplet L1 formed at the outer of the peripheral edge 524a of the discharge hole 524 has the similar shape to that of a droplet located on the bottom plate 521 (refer to FIG. 5A).

In the facing direction, the height of the droplet L1 and the height of the droplet L2 can be expressed as a function of a contact angle between the liquid and the case 50 and a function of a contact angle between the liquid and the battery pack P, respectively (refer to Formulas 3 and 4). Accordingly, the height h1 of the droplet L1 and the height h2 of the droplet L2 can be obtained by means of the Formulas 3 and 4.

That is, y is known, and assuming that 0 (contact angle) of the lower case 52 is 700 and θ (contact angle) of the exterior of the battery pack P is 35°, for example, the height h1 of the droplet L1 and the height h2 of the droplet L2 can be calculated by means of the Formulas 3 and 4.

That is, in a case where the droplet is sea water, the spherical-segment shaped droplet L1 having the calculated value (height h1) is formed at the outer of the peripheral edge 524a of the discharge hole 524, and the spherical-segment shaped droplet L2 having the calculated value (height h2) is formed on the outer surface of the battery pack P.

In view of the above, in the electronic module 100 according to this Embodiment, the height of the leg part 511 is adjusted higher than the sum of the height h1 of the droplet L1 and the height h2 of the droplet L2 which are calculated as described above. That is, the electronic module 100 according to this Embodiment is configured so that the gap G between the outer surface of the bottom plate 521 of the lower case 52 and the outer surface of the battery pack P (refer to FIGS. 3 and 6) is larger than the sum of the height h1 of the droplet L1 and the height h2 of the droplet L2.

By such a configuration, in the electronic module 100 according to this Embodiment, even when a spherical-segment shaped droplet L1 is formed at the outer of the peripheral edge 524a of the discharge hole 524 and a spherical-segment shaped droplet L2 is formed directly below the droplet L1 on the outer surface of the battery pack P (refer to FIG. 6), the droplet L1 does not contact the droplet L2. Accordingly, it is possible to prevent the droplet L1 from combining with the droplet L2 and closing the discharge hole 524.

In the electronic module 100 according to this Embodiment, the height of the leg part 511 is adjusted a little higher than the calculated sum of the height h1 of the droplet L1 formed at the outer of the peripheral edge 524a of the discharge hole 524 and the height h2 of the droplet L2 formed on the outer surface of the battery pack P, in consideration of the design common difference. This is why the excessive height of the leg part 511 hinders compactification of the electronic module 100.

Although the above description explains as an example a case where a contact angle θ is a measurement value, the present disclosure is not limited to this. Since surface tension of liquid is in inverse proportional to the contact angle θ, the contact angle θ may be obtained based on the surface tension of the liquid to obtain a height "h" of a droplet L by means of the obtained contact angle θ.

That is, the Young's formula can be expressed by the following formula.

$$\gamma s = \gamma i + \gamma l \cos \theta$$

Here, γs is surface tension (surface energy) of a solid, γl is surface tension of liquid and γi is solid-liquid interfacial tension. Accordingly, when γs, γl and γi are known, θ can be obtained. That is, the height of the leg part 511 can be determined based on surface tensions of the case 50 and the battery pack P and on surface tension of liquid.

It is noted that the Embodiment disclosed this time is illustrated in all aspects and is regarded as not being limitative. The scope of the present disclosure is defined not by the above meanings but by the Claims, which intends to include all the meanings equivalent to the Claims and all the modifications within the Claims.

It is to be noted that, as used herein and in the appended claims, the singular forms "a", "an", and "the" include plural referents unless the context clearly dictates otherwise.

It is to be noted that the disclosed embodiment is illustrative and not restrictive in all aspects. The scope of the present disclosure is defined by the appended claims rather than by the description preceding them, and all changes that fall within metes and bounds of the claims, or equivalence of such metes and bounds thereof are therefore intended to be embraced by the claims.

What is claimed is:

1. An electronic module for a vehicle comprising a case in which an electronic component is mounted, comprising:
   at least one discharge hole which discharges a liquid droplet contained in the case,
   wherein the discharge hole having a predetermined dimension determined based on surface tension of the liquid droplet;
   a plurality of walls which protrudes from a bottom of the case so as to intersect with an inner surface of the bottom, wherein the inner surface of the bottom is divided into a plurality of areas by the plurality of walls so as to accommodate at least one bus bar, and wherein at least one discharge hole is provided in each area and adjacent to a corresponding one of the plurality of walls; and
   a leg part which maintains a gap between the case and a fixed object to which the case is fixed, wherein the leg part has a dimension determined based on a contact angle between the liquid and the case and on a contact angle between the liquid and the fixed object in a direction in which the case faces the fixed object.

2. The electronic module according to claim 1, wherein the predetermined dimension is configured to allow the liquid droplet to pass through where an own-weight force acting on the liquid droplet from the discharge hole toward an outside of the case due to an own weight of the liquid droplet is greater than a pull force pulling the liquid droplet to a peripheral edge defining the dimension of the discharge hole due to surface tension.

* * * * *